UNITED STATES PATENT OFFICE.

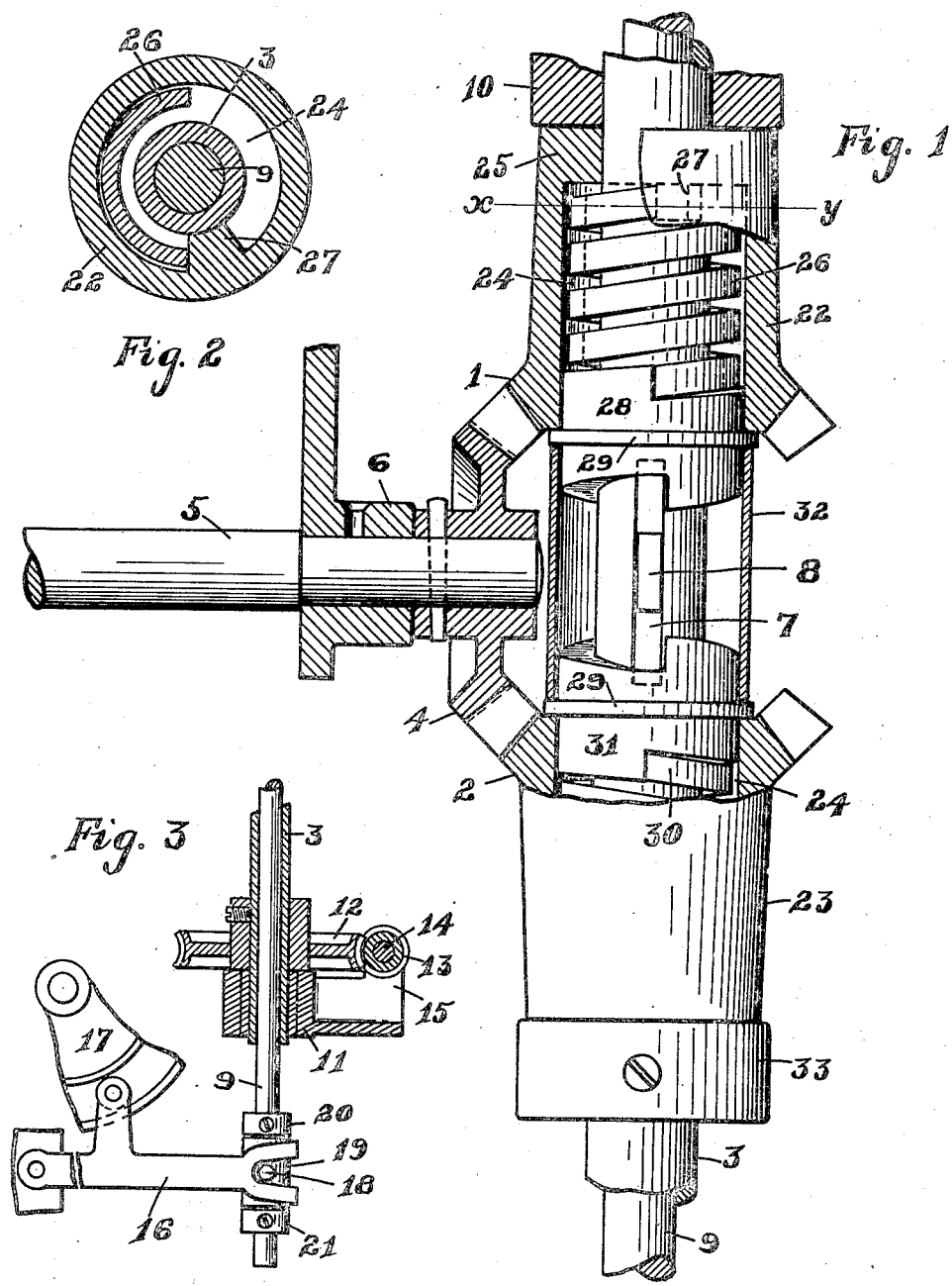

FORREST J. COUCH, OF ROCHESTER, NEW YORK, ASSIGNOR TO ROCHESTER WASHING MACHINE CORPORATION, OF ROCHESTER, NEW YORK.

SHOCK-ABSORBING CLUTCH.

1,346,078.        Specification of Letters Patent.        Patented July 6, 1920.

Application filed September 19, 1918. Serial No. 254,830.

*To all whom it may concern:*

Be it known that I, FORREST J. COUCH, a citizen of the United States of America, residing at Rochester, in the county of Monroe and State of New York, have invented a new and Improved Shock-Absorbing Clutch, of which the following is a specification.

The present invention relates to clutches and particularly to that class in which there is provided a resilient means for preventing the member to be driven from being started too abruptly and with a jerk; and the object thereof is to make use of a spring encircling the driving shaft and inclosed within a chamber formed in the member to be driven, such spring comprising a connecting medium between the clutching means and the member to be driven for receiving the thrust and, by expanding to absorb the shock when the clutching means is moved into operation.

In the accompanying drawings I have shown the principle of the invention in a modification adapted for use with a pair of bevel gears from which rotation is imparted, in either direction, to a third bevel gear in mesh therewith accordingly as one or the other of such pair of gears is clutched to the driving shaft.

The drawings are as follows:—

Figure 1 shows in elevation a driving shaft on which are mounted a pair of bevel gears in mesh with a gear on a shaft to be driven and a pair of clutches embodying the present invention, the gears being in the most part shown in vertical central section; Fig. 2, a sectional view taken along the line *x—y* of Fig. 1 and showing the parts above such line; and Fig. 3, a detail partly in side elevation and partly in section showing the means for rotating the driving shaft and for operating the clutches.

Similar reference numerals refer to similar parts throughout the several views.

At 1 and 2 are seen a pair of bevel gears freely revoluble on a shaft 3 and in mesh with a third bevel gear 4 secured on a shaft 5 revolubly supported in suitable bearings, one of which is seen at 6. The shaft 3 is hollow and is slotted longitudinally at 7 between the gears 1 and 2 to receive a key 8 carried by a longitudinally movable inner shaft 9. This shaft 3 is revolubly supported above and below the gears 1 and 2 in bearings 10, Fig. 1, and 11, Fig. 3, respectively, and when in operation is driven constantly in one direction by a worm wheel 12 secured thereon being engaged by a worm 13 on a shaft 14 supported in the bearing 15 and driven from any suitable means not shown. The inner shaft 9 is caused to rotate with the shaft 3 by the key 8 engaging through the slots 7 and is moved longitudinally by any preferred means as, for instance, the lever 16 actuated by the cam 17 and engaging at one end a pin 18 extending outwardly from a sleeve 19 freely revoluble on the shaft 9 and held against longitudinal movement thereon by collars 20 and 21.

The gears 1 and 2 have extended hub or body portions 22 and 23, respectively, in each of which is formed an annular chamber 24 open at its end adjacent the gear face and extending to the end wall 25 which is bored out to revolubly engage the shaft 3. Within the chamber 24 of the gear 1 is a coiled spring 26 encircling the shaft 3 and of slightly less diameter than that of the chamber. One end of this spring engages a lug 27 projecting into the chamber from the end wall 25 and the other end is engaged by a shoulder formed on a clutch member 28. This member is loose on the shaft 3, extends part way into the chamber 24 and has a centrally disposed annular flange 29 engaging a bearing surface therefor on the inner end of the body portion 22. The gear 2 is provided with a coiled spring 30 and a clutch member 31 similar to those just referred to for the gear 1, the spring 30 of course being wound in the reverse direction from that of the spring 26 and the shoulder therefor on the clutch member 31 being formed accordingly.

The clutch members 28 and 31 are held seated against their respective gears 1 and 2 by means of a tabular spacing member 32 which engages against the flanges 29 formed thereon, and the adjacent ends thereof are cut away to form shoulders adapted to be engaged by the key 8. The gears 1 and 2 are held in place on the shaft 3 between the bearing 10 and the adjustable collar 33.

The operation of the clutch is as follows:—

The inner shaft 9 is moved to bring the key 8 into engagement with one or the other of the clutch members 28 or 31. The member thus engaged will cause the rotation of its respective coiled spring, this being a connecting medium between such member and the gear within which the spring is contained, which will in turn engage the lug 27 to cause the rotation of the gear. It will be readily understood that the spring, the force exerted thereon tending to unwind it, will expand somewhat before rotation is imparted to the gear thus absorbing the shock caused by the evident necessarily sudden starting of the clutch member, and the gear will start rotation easily and without any jerk whatever. The spring when expanded will also grip the inside wall of the chamber and in so doing will have a more positive hold on the gear and the torsional strain will be materially lessened.

It is believed that from the foregoing description the purpose, principle of construction and operation of the shock absorbing clutch are sufficiently clear to call for no further explanation herein.

What I claim is:

1. A clutch of the character described comprising, in combination with a drive shaft, a member freely revoluble on the shaft, an extended body portion on said member and having a chamber, one end of which is open, formed therein, a coiled spring within said chamber and encircling the shaft, a second member freely revoluble on the shaft, one end of said spring being in engagement with one and the opposite end with the other of said revoluble members, and a clutching means carried by and longitudinally movable of the shaft, said clutching means, when in operative position, adapted to engage said second named freely revoluble member with which said spring forms a connection between said clutching means and the other of said members for causing the latter to be rotated with the shaft, said spring being engaged in such a manner that the force exerted thereon tends to unwind it.

2. A clutch of the character described comprising, in combination with a drive shaft, a member freely revoluble on the shaft, an extended body portion on said member and having a chamber, one end of which is open, formed therein, a coiled spring within said chamber and encircling the shaft, a second member freely revoluble on the shaft, one end of said spring being in engagement with one and the opposite end with the other of said revoluble members, and a clutching means carried by and longitudinally movable of the shaft, said clutching means, when in operative position, adapted to engage said second named revoluble member with which said spring forms a connection between said clutching means and the first named of said members, said spring being engaged in such a manner that the force exerted thereon tends to unwind it thus causing it to expand and grip the inside wall of said body portion for the purpose specified.

3. In a device of the character described, the combination with a driving member, a clutch member mounted to turn on the driving member, a driven member having a chamber, a helical spring arranged in said chamber and arranged to provide a resilient driving connection between the clutch member and the driven member, and to expand during such driving into frictional contact with the walls of the chamber, and a clutch member mounted on the driving member and movable into connection with the first named clutch member to establish driving connection between the driving and the driven members.

4. In a device of the character described, a shaft, a clutch member mounted to turn on said shaft, a driven member mounted to turn on said shaft, and having a chamber closed by said clutch member, a helical spring arranged in said chamber with the shaft extending therethrough, one end of the spring engaging the clutch member and the other end engaging the driven member in such a manner that the spring expands when the clutch member connects with the shaft, and a clutch member rotatable with and movable on the shaft to move into and out of engagement with the first named clutch member to connect the latter with the shaft.

5. A device of the character described comprising a shaft, a clutch member mounted to turn about the shaft, a driven member mounted to turn about the shaft, one of the last two named parts being provided with a chamber closed by the other part, a helical spring surrounding the shaft and forming a driving connection between the clutch member and the driven part and expansible into frictional engagement with the walls of the chamber, and a second clutch member driven by the driving member and movable into and out of connection with the first named clutch member.

6. A device of the character described comprising a driving shaft, a clutch mounted to turn on said shaft and having a clutch face at one side, a projection on the opposite side, and a flange between said projection and the clutch face, a driven member mounted to turn on the shaft and having a chamber into which the clutch member projects to close the chamber, the flange serving as an abutment to limit the movement of the clutch member into the chamber, a projection arranged on the driven member in the chamber, a helical spring arranged between the projection on the clutch member and the projection on the driven member, and a clutch member driven by the driving shaft and movable into and out of connection with the first mentioned clutch member.

FORREST J. COUCH.